United States Patent [19]

Silva

[11] 4,223,436
[45] Sep. 23, 1980

[54] SPLICE ASSEMBLY TOOL AND METHOD OF SPLICING

[75] Inventor: Frank A. Silva, Basking Ridge, N.J.

[73] Assignee: Amerace Corporation, New York, N.Y.

[21] Appl. No.: 877,683

[22] Filed: Feb. 14, 1978

[51] Int. Cl.² .......................................... H01R 43/00
[52] U.S. Cl. .................................. 29/869; 29/234; 29/235; 29/280; 29/525; 29/752; 29/754; 29/758
[58] Field of Search ................. 29/628, 464, 525, 718, 29/754, 468, 750, 752, 235, 244, 280, 282, 759, 234, 237

[56] References Cited

U.S. PATENT DOCUMENTS

| | | | |
|---|---|---|---|
| 1,587,689 | 6/1926 | Weiss et al. | 29/282 |
| 1,721,155 | 7/1929 | Johnson | 29/235 X |
| 2,046,490 | 7/1936 | Schuirmann | 29/244 X |
| 2,359,532 | 10/1944 | Searle | 29/234 |
| 2,797,475 | 7/1957 | Benson et al. | 29/282 X |
| 3,192,616 | 7/1965 | Austin et al. | 29/235 X |
| 3,325,885 | 6/1967 | Ziegler, Jr. et al. | 29/751 |
| 3,781,964 | 1/1974 | Cunningham | 29/754 |
| 3,840,969 | 10/1974 | Landis | 29/750 X |
| 4,034,151 | 7/1977 | Silva et al. | 339/112 R X |

Primary Examiner—Carl E. Hall
Attorney, Agent, or Firm—Richard A. Craig; Arthur Jacob; Ken Richardson

[57] ABSTRACT

A splice assembly tool for assembling component parts of an electrical conductor while producing a splice connection between electrical cables therewith, comprises a first structural member adaptable for supporting force applying means thereon, said force applying means enabling a rotary force applied manually thereto to be converted to a longitudinal force for subsequent application against a first component part of said electrical connection, a second structural member adaptable for engaging a second component part in a manner to assist said first structural member in assembling the component parts relative to one another and transmission means for conveying said longitudinal force between said first and said second structural members, said first and said second structural members being coupled to one another by said transmission means, wherein at least one of said component parts comprises a tubular elastomeric sleeve and said force applying means provides a relatively high mechanical advantage when said rotary force is applied thereto so as to facilitate assembly of said at least one tubular elastomeric sleeve about said other component part in an interference fit manner.

21 Claims, 8 Drawing Figures

SPLICE ASSEMBLY TOOL AND METHOD OF SPLICING

This invention resulted from work done under Contract No. E(48-18)-1559 with the Energy Research and Development Adminstration.

The present invention relates generally to electrical connections and pertains, more specifically, to a splice assembly tool for positioning premolded interference-fit elastomeric components of high voltage electrical connector element while producing a splice connection therewith.

The assembly of generally tubular or cylindrically-shaped premolded elastomeric components such as, specifically speaking, adaptor sleeve elements and other splice sleeve housing elements of a high voltage electrical connector assembly, to produce an electrical splice connection for a high voltage electrical power cable, usually requires means to overcome the frictional resistance of the adaptor and/or the housing encountered when these components parts are axially moved into their assembled position. U.S. Pat. No. 3,879,843 describes a manually operated assembly tool in the form of a lever-fulcrum hand tool, for urging the cylindrical outer housing of a splice connector into place.

It is apparent, however, that the leverage provided by such fulcrum-lever tools is limited to overcoming relatively low frictional forces and may not be sufficient to efficiently facilitate the installation of the component parts of a relatively large-size splice connector.

It is therefore an object of the invention to provide an improved splice assembly tool for facilitating the assembly of interference-fit cylindrical components of an electrical connector for high voltage electrical power cables.

It is still another object of the invention to provide a splice assembly tool having a relatively high mechanical advantage so as to enable the assembly tool to quickly and easily overcome relatively high assembly forces when installing interference-fit elastomeric components of an electrical connector while producing an electrical splice connection for high voltage electrical power cables.

The above objects as well as still further objects and advantages are attained by the invention, which may be described briefly as providing a splice assembly tool of a type for assembling generally tubular-shaped premolded interference-fit elastomeric members of an electrical connector while producing a splice connection for an electrical cable therewith comprising, a first structural member adaptable for supporting a first force applying means thereon, said first force applying means enabling a rotary force applied manually thereto to be converted to a longitudinal force, a second structural member adaptable for engaging one cylindrical member in a manner to assist said first structural member in assembling said one member relative to another cylindrical member with an interference-fit, at least one elongated transmission means for conveying said longitudinal force between said first and second structural members, said first and said second structural members being coupled to one another by said at least one transmission means.

The invention will be more fully understood, while still further objects and advantages thereof will be made apparent in the following detailed description of embodiments of the invention illustrated in the accompanying drawing, in which.

Referring now to the drawing, and especially to FIGS. 1 through 3 and 6 thereof, there is illustrated a splice assembly tool 10 constructed in accordance with the invention. Preferably, splice assembly tool 10 as applicable for facilitating the installation of generally tubular-shaped premolded elastomeric adaptor sleeve elements 12 of an electrical splice connector assembly over cylindrically-shaped insulated ends 14 of high voltage electrical power cables generally referred to by the reference numeral 16, to produce a completed electrical splice connection 18. Splice connection 18 may be of a type more fully described, for example, in U.S. Pat. No. 4,034,151, incorporated herein by this reference and which latter Patent is assigned to the same assignee as the present application. Although the details of the component parts or elements of the connector assembly pertaining to the present invention have not been fully described herein for the sake of clarity and brevity, it will become apparent that the elements comprising the connector assembly 18 pertaining to the present invention, may be substantially the same as the corresponding elements comprising the connector assembly shown in FIGS. 1-3 of U.S. Pat. No. 4,034,151.

Further, the method for preparing power cable 16 for the installation thereon of the various component parts of the connector assembly may be substantially identical to the method for preparing the same power cable for the installation thereon of the corresponding parts of the connector assembly described in the aforesaid U.S. Pat. No. 4,034,151.

Splice assembly tool 10 comprises a first structural metal housing member or yoke, generally indicated by the reference numeral 24. Housing member 24 comprises two rectangular-shaped substantially flat generally thin-walled spaced plates 26. Plates 26 are coupled to one another and are held in a spaced relationship with two tubular-shaped hollow bosses or spacers 28. Spacers 28 are located between plates 26 at opposed end corners 30 thereof. Each tubular-shaped spacer 28 receives a bolt type fastener 32 inserted therein via plate through apertures 34 at end corners 30. Nuts and washers, both of which are generally designated by reference numeral 36, are utilized to secure bolts 32 within plate apertures 34, and thus, hold plate 26 in a coupled spaced relationship as shown.

Housing member 24 is provided with a freely-moving elongated driving gear shaft, generally referred to by reference numeral 38. An intermediate portion 40 of driving gear shaft 38 extends between spaced plates 26 while each distal end portion 42 thereof extends through a corresponding shaft-receiving plate aperture 44. Each shaft-receiving aperture 44 is located generally within each housing side plate 26 near a plate corner 46. Each distal shaft end 42 is movably secured within each plate aperture 44 by a retainer ring 48 seated within a retainer ring-receiving slot 50. Each retainer ring 48 is spaced slightly away from an outer surface 52 of first housing side plate 26, such that, driving shaft 38 is enabled to move slightly in opposing axial directions a distance defined by the degree of separation between each retainer ring 48 and each outer surface 52. Each shaft end 42 at a terminal portion thereof is provided with a hexagon-shaped configuration 43.

Intermediate portion 40 of driving gear shaft 38 is provided with a spur-type driving gear member generally designated by the reference numeral 54 rotatably mounted thereon. Driving gear member 54 is fastened to driving shaft 38 at a collar portion 56 thereof by a set screw 58 threadably engaged in an internally threaded collar aperture 60 therein. Driving gear member 54 thus is secured to driving shaft 38 in a manner to prevent slipping thereof in either an axial or circumferential direction.

Housing member 24 is also provided with a fixed non-rotatable follower gear shaft generally designated by reference numeral 62. An intermediate shaft portion 64 thereof extends between housing side plates 26, while each distal end portion 66 extends through a corresponding shaft-receiving plate aperture 68. Each shaft-receiving aperture 68 is located generally centrally in each housing side plate 26. Each follower shaft end 66, and thus follower shaft 62, is assembled into each shaft-receiving aperture 68 by force-fit in a manner to prevent follower shaft 62 from any axial or circumferential movement thereabout. Each follower shaft end 68 is further secured within housing side plate 26, with a retainer ring 70. Each retainer ring is seated within a retainer ring-receiving slot 72 formed at shaft end 66.

Intermediate shaft portion 64 of follower shaft 62 is provided with rotatably mounted spur-type follower gear and drum members, generally referred to by reference numeral 74, positioned thereon so as to be in operative meshed engagement with driving gear 54. Drum portion 78 of member 74 is constructed integral with follower gear portion 76 of member 74 so as to form a composite unitary element. Drum portion 78 comprises an outer raised rim-like edge 80. Raised edge 80 is spaced from follower gear portion 78 so as to define a shallow recess 82 therebetween for supporting an elongated flexible transmission means. Transmission means is in the form of a stranded cable or wire rope, generally referred to by reference numeral 84, which will be more fully explained hereinafter.

A standard spring biased pawl element 86 is affixed to one of the housing plates 26 in a manner to be in a removable meshed relationship with drive gear member 54. Pawl element 86 is attached to an inner surface 88 of the housing side plate 26 associated therewith at a flange portion 90 of pawl 86 by a screw 92. Screw 92 is inserted through flange aperture 95 so as to threadably engage the housing side plate 26 associated therewith. Biasing spring 77 is connected between pawl element 86 and a screw 79, which screw 79 threadably engages housing side plate 26 through the latter's surface 88 as is clearly shown in FIG. 1. Pawl element 86, when in meshed engagement with drive gear member 54, prevents follower gear portion 76 from slipping or reversing direction when enabled to rotate by driving spur gear 54. Follower gear portion 76 is enabled to rotate in any direction when pawl element 86 is removed from mesh engagement with follower gear portion 76.

Referring again to wire rope 84, it is substantially encased in a nylon constructed elongated tubular member 94. Cable 84 is secured to drum portion 74 at a first non-encased terminal end portion 96 thereof. First end portion 96 is inserted or seated within a through aperture 98 formed within drum portion 74 in a radially offset manner relative to the central axis of the drum and extending substantially perpendicular to said axis. A collar and a set screw 100 and 101 are employed to fasten first end 96 within through aperture 98. The set screw being disposed in an internally threaded aperture perpendicular to through aperture 98. An intermediate portion 102 of wire rope 84 extends from drum portion 74, via a through aperture 104 which is formed within an elongated hollow cylindrical-shaped spacer tube 106. The intermediate portion 102 terminates in the opposed non-encased second terminal end portion 108 of wire rope 84.

Second wire rope end 108 is folded back upon itself to form an eye-bolt type loop 110. The loop configuration is retained with a hexagon-shaped hollow clasp and nut assembly 112 as substantially shown in FIGS. 1 and 2. An inwardly facing surface portion 114 of wire rope 84, defined by loop 110, is immovably seated within a channel configured collar 116 by a press fit. This prevents loop 110, and thus, terminal end 108 from becoming frayed when attached to a second structural member as will be more fully explained hereinafter. Wire rope collar 116 is positively fastened into wire rope 84 at loop 110 by crimping or pinching distal ends 117 thereof against the wire rope.

Figure 1:
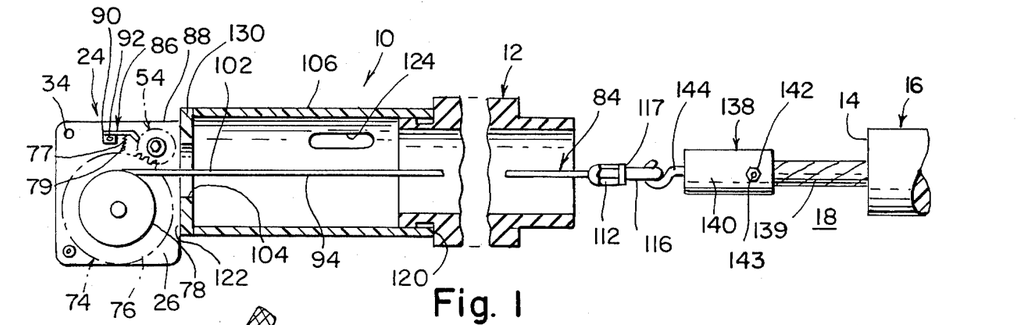
FIG. 1 is a front view of a splice assembly tool being employed to assemble an adaptor sleeve over the cable insulation of a high voltage electrical power cable in accordance with the principles of the invention.
Figure 2:
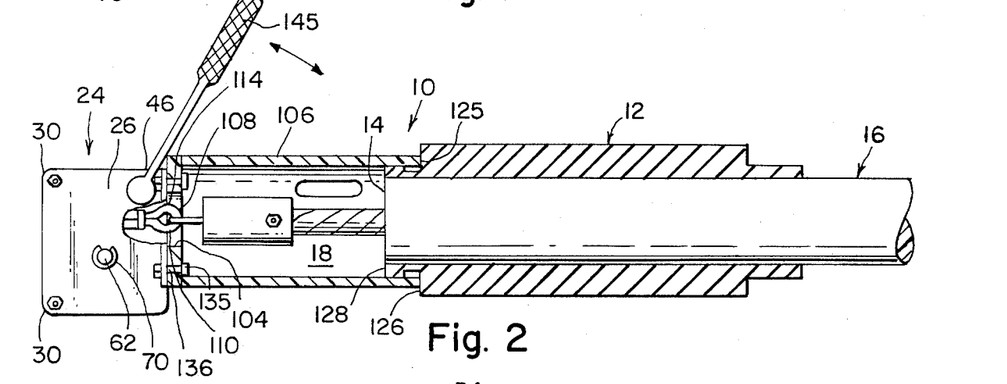
FIG. 2 is a front view of the splice assembly tool of FIG. 1 upon completion of the assembly of the adaptor sleeve.
Figure 3:
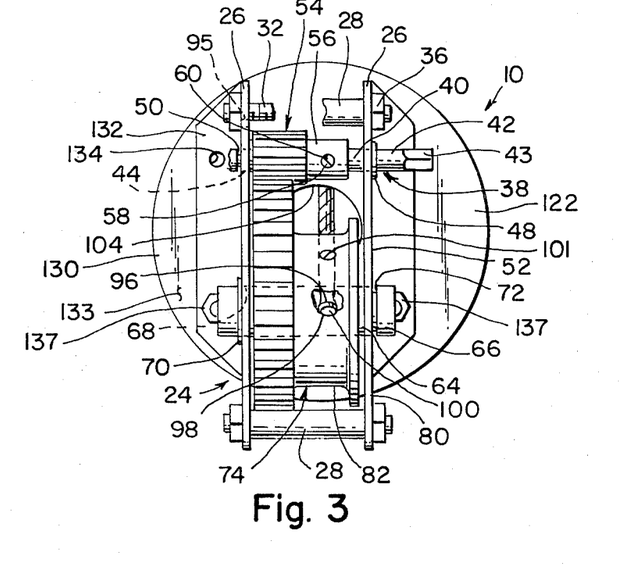
FIG. 3 is an end view of the splice assembly tool of FIG. 1 illustrating the details of construction thereof.

Spacer tube 106 has a relatively thin-walled hollow cylindrically-shaped configuration and includes an open end 120, a closed end 122, and an elongated oblong shaped sight-slot 124 for viewing wire rope 84 therein. Open end 120 of spacer tube has a diameter of a size such that the cylindrical end surface 125 of tube 106 fits securely in an abutting manner against the circumferentially extending shoulder or ridge formed at each end portion of each adapter sleeve as seen in FIGS. 1 and 2. The closed end 122 of the spacer tube is provided, with a circular-shaped substantially flat cover plate 130. Preferably, both the spacer tube and the cover plate are of rigid plastic material and cover plate 130 is fixedly secured to spacer tube 106 with a suitable bonding agent applied to the peripheral portion of the cover plate in engagement with corresponding portions of the spacer tube. The cover plate 130 provides a base or foundation for mounting housing side plates 26 thereon and includes an opening 104 through which wire rope 84 is inserted. Spacer aperture 104 is located centrally within cover plate 130 and with respect to drum member 78, so as to enable wire rope 84 to be either reeled in or let out through aperture 104 without any hinderance from the boundaries defining the aperture 104 as will be more fully explained hereinafter.

Each housing side plate 26 is provided with a perpendicular extending flange 132 that is attached to cover plate 130 at an outer surface 133 thereof. Each flange 132 is provided with two spaced through apertures 134. Fastener bolts 135 are inserted into flange apertures 134 and into corresponding through apertures 136 within cover plate 130. Nuts and washers, generally designated by reference numeral 137, are utilized to secure bolts 135 therein.

Splice assembly tool 10 is further provided with a second structural member, generally designated by the reference numeral 138. Second structural member 138 comprises a hollow cylindrically-shaped clamp portion 140 which is inserted over insulation stripped cable end portion 139. Clamp 140 is positively secured to terminal cable end 139 with a set screw 142 threadably inserted within a set screw-receiving aperture 143 therein. Second structural member 138 is also provided with a hook portion 144 which is formed integral with clamp 140 and extends longitudinally outwards from an end thereof as is substantially shown in FIGS. 1 and 2.

Installation of each adaptor sleeve 12 is initiated by supporting the sleeve and the splicing assembly tool 10 manually, while hook 144 of second structural member 138 is connected through loop 110 of wire rope 84. See FIG. 1. Open spacer tube end 120 is then positioned so that its edge 125 abuttingly engages shoulder 126 of adaptor sleeve 12 at adaptor end portion 128. As mentioned previously, the diameter of spacer tube 106 at open end 120 is complementary to the reduced diameter end portion 128. This enables spacer tube 106 at end 120 to fit snugly against shoulder 126 for the purpose of thrusting or pushing each adaptor sleeve 12, to be assembled over a cable end 14, in an axial direction towards second structural member 138 when under the influence of an applied longitudinal force.

The longitudinal force is obtained by applying a torquing or rotary force to the hexagon-shaped end 43 of driving gear shaft 38. A standard hand wrench 145, suitable for employment with hexagon-shaped end 43, is employed to apply the rotary force. The applied rotary force is converted to a linear longitudinal force at wire rope 84 and follower gear and drum member 74. The longitudinal force is conveyed by wire rope 84 between housing member 24 and structural member 138. Driving gear 54 and follower gear and drum member 74 substantially function to provide a relatively high mechanical advantage when the relatively small rotary force is applied manually thereto. The mechanical advantage of assembly tool 10 enables the latter to quickly and easily overcome frictional forces encountered when assembling each adaptor sleeve 12 over insulated cable end 14.

During torquing, driving gear 54 drives follower gear and drum members 74, and thus also enables drum portion 76 to reel in wire rope 84 thereabout. Wire rope 84, in turn, conveys the longitudinal force to second structural member 138 in hook portion 144. With housing member 24 being freely movable in a longitudinal direction, and with second structural member 138 being positively clamped to cable end housing end 139, member 24 and spacer tube 106 during torquing are enabled to continuously push or thrust adaptor sleeve 12 from a first position, where adaptor sleeve 12 is axially displaced from cable end 139 to a second position, where adaptor sleeve 12 is disposed about the insulation portion of the cable 14 in an interference-fit manner as substantially shown in FIG. 2.

Upon assembly of each adaptor sleeve 12 over each insulated cable end 14, as described, pawl element 86 is moved out of meshed engagement with drive gear 54. This frees drive gear 54 plus follower gear and drum member 74 so as to permit housing member 24 to be moved away from the cable end thereby enabling drum portion 78 to unwind and let out wire rope 84 therefrom. Wire rope 84 at loop 110 may then be easily detached from hook portion 144, thus, enabling splicing assembly tool 10 to be removed and used to assemble another adaptor sleeve 12.

Turning to FIGS. 4–8, in accordance with the invention, a preferred alternative embodiment of splicing assembly tool 10 is illustrated and is generally referred to by reference numeral 146. Splicing assembly tool 146 comprises a first structural member, generally referred to by reference numeral 148, in the form of a rectangular configured housing or yoke. First housing member 148 comprises a relatively thin-walled substantially flat rectangular-shaped base plate member 150; two relatively thin-walled substantially flat rectangular-shaped side plates 152; and two relatively thin-walled substantially flat end plates, which end plates are designated by reference numerals 154 and 156. Preferably, all of the aforesaid plates except for a portion of end plate 156 as will be more fully explained hereinafter are joined to one another by welding.

Each first housing side plate 152 is provided with two rectangular-shaped stiffener plates 158. Each stiffener plate 158 is welded diagonally on an inner surface 160 of the involved first housing side plate 152, such that, each stiffener plate 158 extends from the vicinity of a lower corner 162 of first housing side plate 152, near first housing base plate 150, to a central region of the side plate. Each stiffener plate 158 is provided with a through aperture 166 at one end thereof and each aperture 166 contains a bronze bearing ring 170 therein. Each bearing ring 170 is assembled into each aperture 166 by press fit so as to prevent any circumferential or axial movement thereof. Each stiffener plate 158 in turn, has attached thereto a separate follower gear shaft 172.

A first shaft end 174 of each follower gear shaft 172 is welded onto each stiffener plate 158, such that, an opposed or second shaft end 176 thereof extends perpendicularly from each stiffener plate 158. Subsequent to welding each stiffener plate 158 unto each inner surface 160 of first housing side plate 152, each second shaft end portion 176 of following gear shaft 172 is inserted through a corresponding shaft-receiving aperture 178 so as to extend substantially beyond an outer surface 180 of first housing side plate 152 and the stiffener plate is welded in place as described above. It will be noted that each shaft-receiving aperture 178 is substantially centrally located within each first housing side plate 152.

Each follower gear shaft end 176, extending beyond outer surface 180, is provided with a follower gear 182 rotatably mounted thereon by means of a shaft-receiving aperture 184 therein. A bronze bearing ring 186 is inserted onto each follower gear shaft end 176 in position between outer surface 180 of each first housing side plate 152 and an adjacent surface 188 of each follower gear 182. Each follower gear shaft end 176 is also provided with a sprocket gear 190 rotatably mounted thereon via a shaft-receiving aperture 192 within each sprocket gear 190.

Each sprocket gear 190 is coupled to a corresponding follower gear 182 by three dowel pins 194 each one of which is inserted by press-fit into a corresponding pin-receiving aperture 196 formed within an outer surface 198 of each sprocket gear 190, and is inserted into a corresponding pin-receiving aperture 200 formed within an outer adjacently positioned surface 202 of follower gear 182. This arrangement enables each coupled sprocket gear 190 and follower gear 182 to always rotate simultaneously in one same direction. A retainer ring 204 is seated within a retainer ring receiving slot 206 formed on each follower gear shaft end 176. Thus, each coupled sprocket gear 190 and follower gear 182 is retained on follower gear shaft end 176 between a bearing ring 186 and a retainer ring 204.

A conventional spring biased pawl element 208 is affixed to an outer surface 180 of one of the first housing side plates 152 in a manner to be in a meshed relationship with one of the two follower gears 182. Pawl element 208 is attached to outer surface 180 at a flanged portion 210 of the pawl element by a screw 212 inserted through a flange aperture 214 therein, so as to threadably engage first housing side plate 152 associated therewith. Biasing spring 216 is connected between pawl element 208 and a screw 218, which screw 218 threadably engages first housing side plate 152 as clearly shown in FIGS. 4 and 6. Pawl element 208 when in meshed engagement with the one follower gear 182 prevents both of the follower gears 182 from slipping or reversing direction when the follower gears 182 are enabled to rotate as will be more fully explained hereinafter. When pawl element 208 is removed from meshed engagement with the one follower gear 182, both follower gears 182 are free to rotate together in any direction.

A separate drive shaft-receiving aperture 220 is disposed within each housing side plate 152 along an axis displaced from the corner axis of apertures 178 and are aligned with corresponding shaft-receiving apertures 166 formed within stiffeners 158 near the bottom-most end thereof. A drive gear shaft, generally indicated by reference numeral 222, is rotatably mounted at opposite distal shaft end portions 224 thereof within bronze bearing rings 170 within stiffener apertures 166 and within corresponding shaft-receiving apertures 220 of side plates 152, such that, an intermediate shaft portion 226 thereof extends between the first two housing side plates 152. Each shaft end portion 224 extends through its corresponding shaft-receiving aperture 220 to project beyond outer surface 180 of each housing side plate 152.

The drive spur-type gears 228 are mounted on drive gear shaft 222, one at each shaft end portion 224 thereof, so as to be in operative meshed engagement with a corresponding one of each follower gear 182. Each drive gear 228 is provided with two spaced longitudinally extending square keyways 229. Similarly, each drive shaft end 224 is provided with two spaced longitudinally extending square keyways 230. A separate key 232 is seated within each pair of keyways 229 and 230 as substantially shown in FIG. 7. When each drive gear 228 is mounted onto each drive shaft end 224, each drive gear 228 is positively retained on drive shaft end 224 by a metal dowel pin 234 engaging the keyway 230 to one side of key 232 in a press fit manner. Each pin 234 is received within a pin-receiving aperture 236 situate on the hub portion 238 of drive gear 228 so as to enable drive gear 228 to rotate simultaneously with drive shaft 222, as well as to positively retain drive gear 228 affixed thereto.

Figure 6:
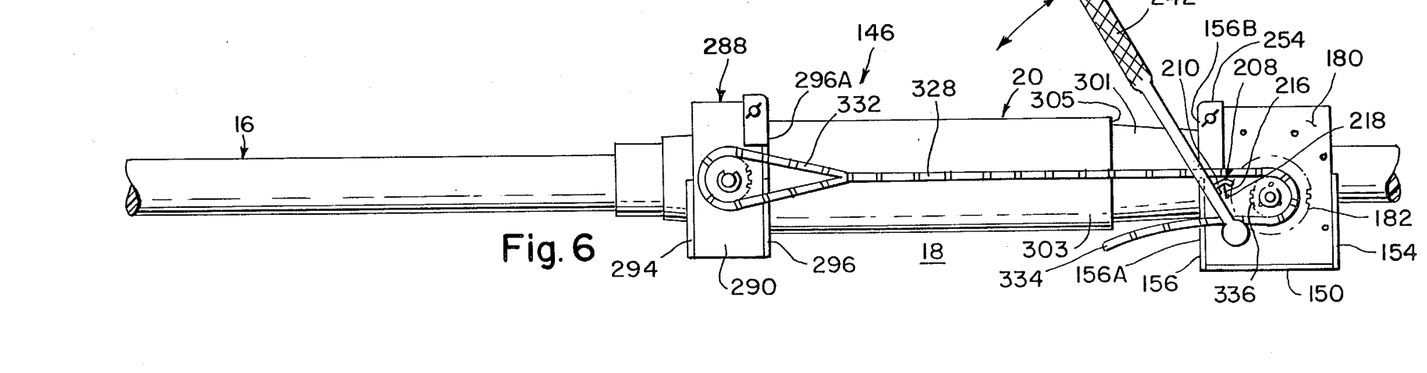
FIG. 6 is a front view of the alternative embodiment of the splice assembly tool of FIG. 4 upon completion of the assembly of the outer splice sleeve housing.

Each hub portion 238 of drive gear 228 is provided with a hexagonally-shaped end 240 defining a wrenching surface which is adaptable to be employed with a conventional hand ratchet wrench 242 (see FIG. 6). Drive shaft 222 is also provided with bronze bearing rings 244 inserted thereon. Each bearing ring 244 is positioned between each outer surface 180 of first housing side plate 152 and an inner adjacently positioned surface 246 of driving gear 228.

First housing end plate 154 is welded to first housing side plates 152 and bottom plate 150 and is constructed so as to cover or enclose only the lower or bottom half 248 of first housing member 148 and toward this end includes a pair of upper terminating surfaces 249. An upper generally centrally located edge portion extending between the two surfaces 249 defines a half circular-shape opening 250 having a shape corresponding to the outer diameter or circumference of power cable 16.

Figure 7:
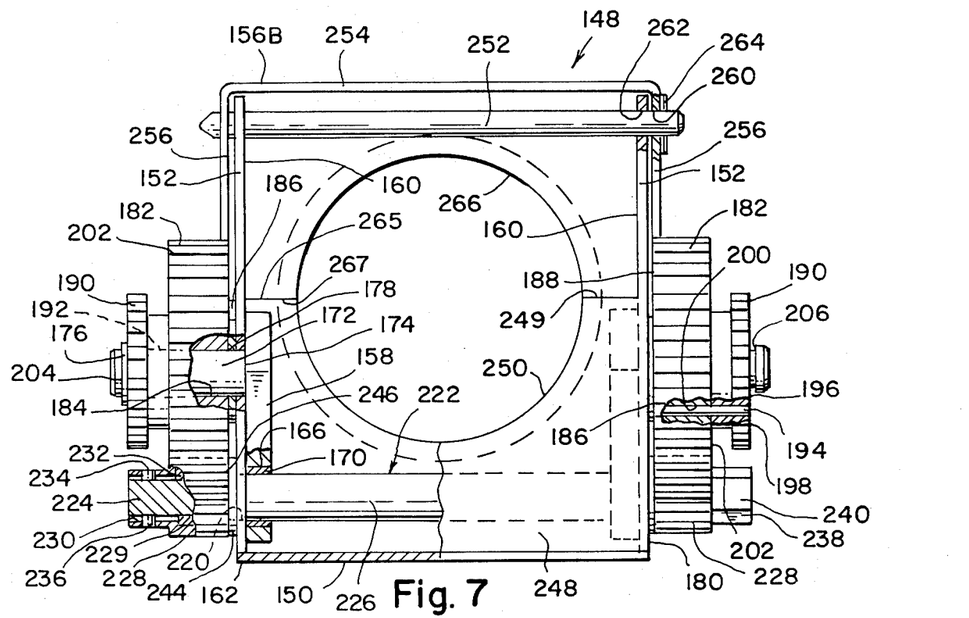
FIG. 7 is an end view of a first housing member of the splice assembly tool of FIG. 4 illustrating the details of construction thereof.
Figure 8:
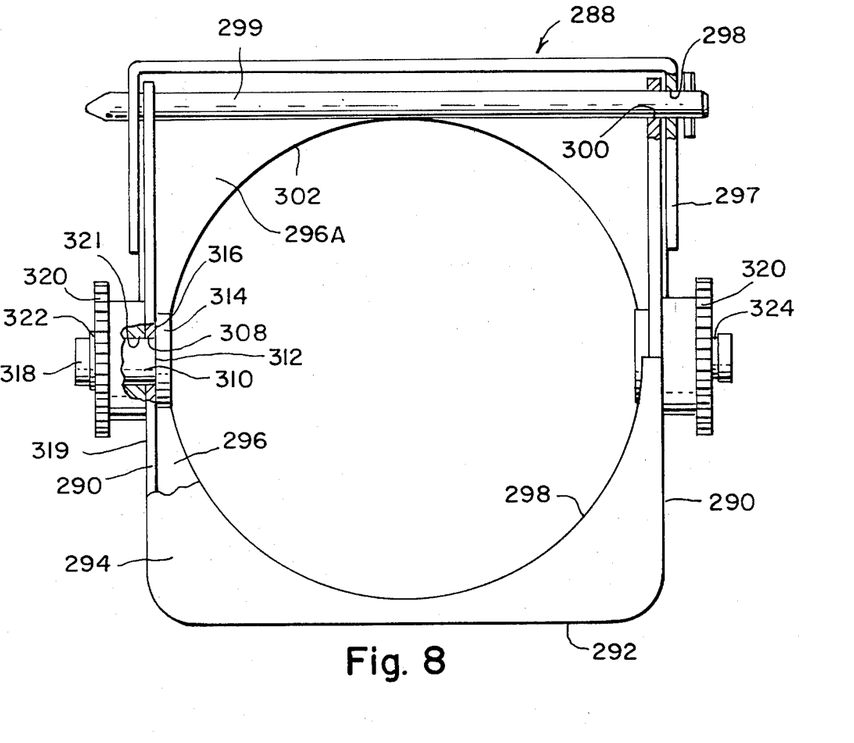
FIG. 8 is an end view of a second housing member of the splice assembly tool of FIG. 4 illustrating the details of construction thereof.

The remaining first housing end plate 156 is constructed in two complementary interjoining sections, an upper half section 156A and a lower half section 156B. Lower half section 156A is welded to first housing side plates 152 and bottom plate 150, while upper half section 156A is removably attached to first housing side plates 152 by means of an elongated pin-locking rod 252. An upper rim portion 254 of upper half section 156A as well as two side rim portions 256 are bent or formed so as to be substantially perpendicular with respect to the remaining portion of upper half section 156A, as substantially shown in FIGS. 4, 5 and 7. Upper half section 156A is provided with locking rod receiving apertures 260 while first housing side plates 152 are provided with locking rod-receiving apertures 262. Rod 252 is retained in rod-receiving apertures 260 and 262 by a cylindrically-shaped retainer pin member 264 positioned radially therein as is clearly shown in FIG. 7. When upper half section 156A is assembled relative to first housing 148 as best seen in FIG. 7, upper and lower half sections 156A and 156B, respectively, have correspondingly opposed terminating edges 265, 267 which abuttingly engage each other on either side of a circular-shaped opening 266 centrally located with respect to each half section 156A and 156B. The diameter and shape of circular opening 266 is complementary to the diameter and external shape of the end portion 128 of adaptor 12 such that the portion of end plate 156 surrounding the opening will engage circumferentially extending shoulder 126.

Preferably, first housing end plate 156 is provided with a circular-shaped collar 268. Collar 268 is welded around a perimeter portion of circular-shaped opening 266 on an outer surface 272 common to top and bottom half sections 156A and 156B. To this end, collar 268 is constructed in two halves, one half belonging to top half section 156A and the other half belonging to bottom half section 156B. Collar 268 projects perpendicularly from common outer surface 272 of first housing end plate 156, and is provided with a wall thickness, circular-shape and inner diameter sufficient to enable collar 268 to abuttingly engage and seat against shoulder 126 of adaptor sleeve 12. However, it is to be understood that the use or existence of collar 268 is not essential. This is so as the circular-shaped opening 266 may be sized so that the peripheral portion of end plate 156 adjacent thereto abuttingly engages shoulder 126 of adaptor sleeve 12 as previously mentioned.

Figure 4:
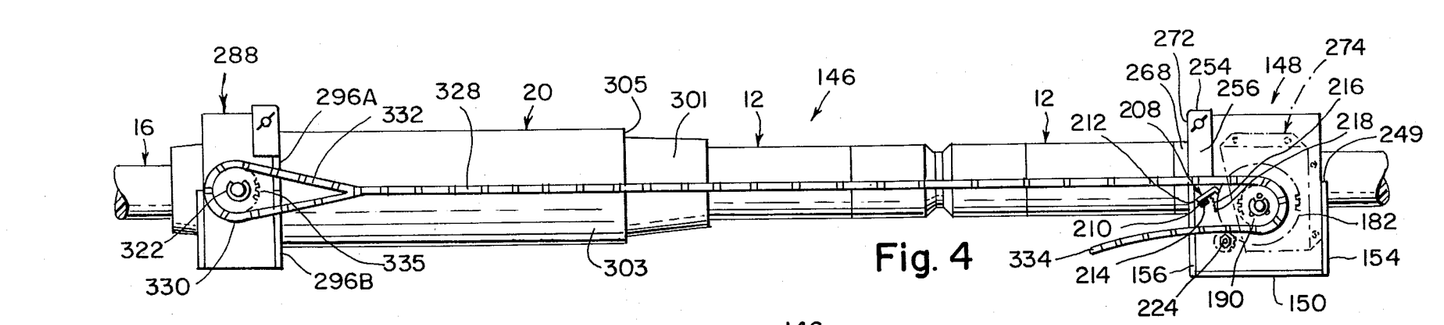
FIG. 4 is a front view of an alternate embodiment of the splice assembly tool of FIG. 1, applicable for use with an outer splice sleeve housing, being employed to assemble the outer splice sleeve housing over a pair of previously installed adaptor sleeves, to produce a splice connection for a high voltage electrical power cable in accordance with the principles of the invention.

First housing member 148 may further be provided with two gear cover members, generally referred to by reference numeral 274, respectively enclosing each coupled follower gear 182 and sprocket gear 190 at each first housing side plate 152 as substantially indicated in FIG. 4 by phantom lines with the gear covers being removably attached with conventional fastener elements extending through registering apertures in each cover plate and its associated side plate 152.

In accordance with the invention, the alternative embodiment of assembly tool 146 is provided with a second structural member, generally referred to by reference numeral 288. Second structural member 288 is constructed in the general form of a rectangular configured housing or yoke. Second structural member or housing 288 comprises an elongated somewhat narrow relatively thin-walled substantially flat metal housing plate member. The housing plate member has been shaped in a manner to form a flat bottomed "U" configured frame which defines a housing bottom 292 and two housing sides 290 as is substantially shown in FIG. 8. Second housing member 288 is also provided with two relatively thin-walled substantially flat housing end plates 294 and 296. Second housing end plate 294 is constructed and joined to second housing side plate portions 290 and second housing bottom plate portion 292 in substantially the identical manner that first housing end plates 154 and 156 are constructed and joined to first housing 148, except a half or semi-circular configured opening 298 defined by second housing plate 294 is of a shape and diameter corresponding to the external circular-shape and diameter of outer splice sleeve housing 20 in a manner to be more fully explained anon.

Similarly, a remaining second housing end plate 296 constructed so as to include an upper portion 296A that is removably attached to second housing side plates 290 with a locking rod 299. Locking rod 299 is inserted within through apertures 298 of rim 297 of second housing end plate 296 and within through plate apertures 300, which correspond with and are aligned relative to rim apertures 298, in substantially an identical manner as described in connection with first housing end plate 156 and its associated locking rod 252.

Second housing end plate 296 differs, however, in that it is preferably constructed without a collar 268 as described in connection with first housing end plate 156. Moreover, the diameter and shape of circular opening 302, defined by top and bottom halves 296 and 296A of the second housing end plate is of a diameter and shape complementary to the diameter and shape of end portion 301 of outer splice sleeve housing 20 at the intersection thereof with enlarged diameter central portion 303 which intersection defines a shoulder 305.

Each second housing side plate 290 is provided with a shaft-receiving aperture 308 located centrally therein for receiving a sprocket gear shaft 310. Subsequently to inserting each sprocket gear shaft 310 into aperture 308, a shaft end 312 of each sprocket gear shaft 310 is welded onto a coin-shaped mounting pad 314. An opposed or second shaft end 318 of each sprocket gear shaft 310 is inserted into one of the shaft-receiving apertures 308, such that, each pad 314 seats flush against an inner adjacent surface 316 of each second housing side plate 290, whereby each pad 314 is enabled to be welded to each adjacently positioned side plate 290. Each second shaft end 318 of sprocket gear shaft 310 extends within through aperture 308 and projects substantially beyond an external surface 320 of each second housing side plate 290.

Each sprocket shaft end 318 of each one of the two sprocket shafts 310 is provided with a sprocket gear 320 rotatably mounted thereon via a shaft-receiving aperture 322 therein. Each sprocket gear 320 is retained on a shaft end 318 by a retainer ring 322 seated within a retainer ring receiving slot 324 provided by each sprocket gear shaft end 318.

Figure 5:
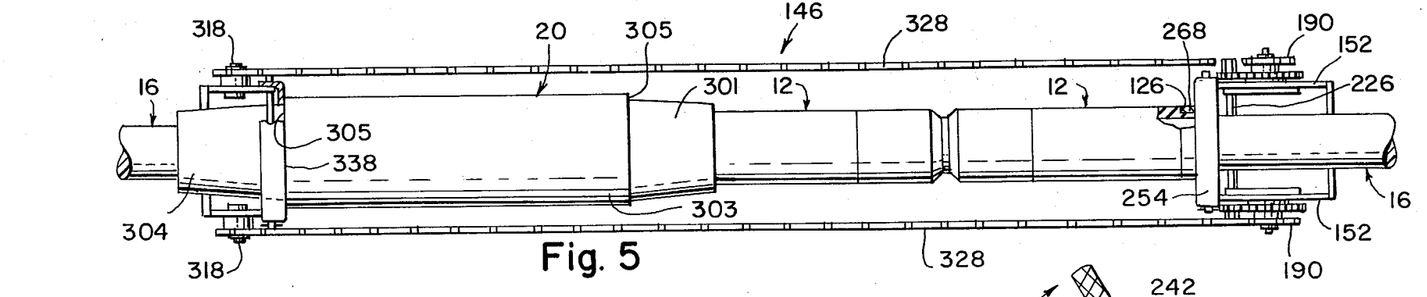
FIG. 5 is a top view of the alternative embodiment of the splice assembly tool of FIG. 4.

Assembly tool 146 is provided with an elongated flexible transmission means in the form of two conventional roller-type chains 328. Each chain 328 is provided with a first end 330 having an eye-loop configuration 332 and a second straight or non-looped end 334. Chains 328 couple first and second housing 148 and 288 to one another in a manner substantially as shown in FIGS. 4–6. It will be appreciated that loop portion 332 is operatively attached about the spokes 334 of a different one of each sprocket gear 320 of second housing member 288 such that, each chain 328 is enabled to exert a pulling force on each sprocket gear 320 connected thereto, and thus exert a pulling force on second housing member 288 without allowing each chain 328 to be reeled in by the involved sprocket gear 320 when under the influence of a longitudinal force. Each remaining straight chain end 334 is operatively attached about the spokes 336 of a different one of each sprocket gear 190, such that, each sprocket gear 190 is enabled to reel in each straight end portion 334 of each chain 328 when under the influence of a longitudinal force as will be more fully explained hereinafter.

In accordance with the invention, the alternatively preferred embodiment of splice assembly tool 146 may be employed to install the outer splice sleeve housing 20 over the two axially disposed adaptor sleeves 12, so as to complete splice connection 18, as shown in FIG. 6. Towards this end, it is to be noted that prior to assembling outer housing 20, preferably, each adaptor sleeve 12 is assembled onto power cable 16 utilizing the prior disclosed preferred embodiment of the splice assembly tool 10 of the invention. However, it should be understood that the use of assembly tool 10 for the installation of adaptor sleeves 12, or the use of substantially all other assembly hand tools, for that matter, is not a prerequisite for the use of assembly tool 146 as aforedescribed in the second preferred embodiment of the invention.

In assembling outer splice sleeve housing 20, the connected ends of power cable 16, with adaptors 12 already in place and thus, cable 16 itself, is positioned between first and second housing members 148 and 288. This is done by removing each top half section 156A and 296A of each first and second housing end plate 156 and 296, respectively. Power cable 16 is seated within first housing member 148, such that, the outer diameter or cylindrical surface defined by insulated cable end 14 is snugly encased or encircled by circular-shaped opening 266 and collar 268 of first housing end plate 156. Collar 268 is positioned in abutting engagement with respect to the shoulder 126 on one of the two adaptor sleeves 12 while the outer diameter of cable 16 is received loosely within the circumferential portion defining half circular opening 250.

At second housing member 288, when the electrically connected ends of cable 16 are placed between the first and second housing members 148 and 228, the outer diameter or cylindrical surface of outer splice sleeve housing 20 is snugly encased or encircled by circular-shaped opening 298 defined by second housing end plate 296. Circumferential edge 338 of circular opening 298 at second housing end plate 288 is positioned with respect to end portion 304 of outer housing so as to abuttingly engage shoulder 305 and thereby facilitate axial movement of outer splice sleeve housing as shown in FIG. 5.

Next, first and second housing members 148 and 288 are coupled to one another via sprocket gears 320 and 190 as aforedescribed. Wrench 242, or an equivalent hand tool, is then inserted onto hexagon-shaped ends 240 of driving gear shaft 222 and a torquing or rotary force is applied thereto.

The rotary force is converted to a linear longitudinal force at each roller chain 328 with the aid of drive gear 228, follower gears 182, and sprocket gears 190 of first housing member 148, as well as sprocket gears 320 of second housing member 288. The longitudinal force is conveyed between first and second housing members 148 and 288 by roller chains 328. Drive gear 228 and follower gear 182 of first housing member 148 function substantially to provide a relatively higher mechanical advantage when the rotary force is applied thereto, so as to enable assembly tool 146 to quickly and easily overcome any frictional resistance required to assemble outer splice sleeve housing 20 over the two adaptor sleeves 20 in an interference-fit manner. Of course, when drive gear 228 is torqued sprocket gears 190 of first housing member 148 reel in chains 328 during application of the rotary force.

First housing member 148 when under the influence of the converted rotary force, that is the longitudinal force, is enabled by chains 328 to push axially against adaptor sleeve 12 at shoulder 126, but is restrained from longitudinal movement in a direction toward second housing member 288 by the retention action of adaptor sleeves 12.

Second housing member 288, when under the influence of the longitudinal force, is substantially enabled by chains 328 to push continuously against outer splice sleeve housing 20 at shoulder 305 in a longitudinal direction towards first housing member 148. Second housing member 288, however, is free to move longitudinally towards first housing member 148 when under the influence of the longitudinal force. Hence, during application of the torquing force, and the simultaneous reeling in of chains 328 by sprockets 190, second housing member 288 is pulled axially by chains 328 so as to continuously push or thrust outer housing 20 from a first position, where it is axially positioned and separated from the two assembled adaptor sleeves 12 as shown in FIGS. 4 and 5 to a second position, where it is positioned over the adaptor sleeves 12, as shown in FIG. 6.

Upon completion of the installment of outer splice sleeve housing 20, top half sections 156A and 296A of each first and second housing members 148 and 288 are removed, as well as chains 328. First and second housing members 148 and 288 are then freed from electrical cable 16 and made available for subsequent usage on another splice connection.

Although preferred embodiments of the invention have been disclosed above in detail to satisfy the requirements of statute, it will be appreciated that various modifications and changes may be made without departing from the principles of the invention.

Moreover, it will be appreciated that the splice assembly tool may be employed in conjunction with the fluid-assist technique disclosed in the aforementioned U.S. Pat. No. 4,054,743 in which event axial positioning of the adaptor sleeve over the insulation jacket of the cable with the aid of the assembly tool of FIGS. 1–3, or axial positioning of the outer splice housing over the positioned adaptor sleeves with the aid of the assembly tool of FIGS. 4–8 may even be further facilitated.

Accordingly, the present invention should be limited only by the true spirit and scope of the appended claims.

The embodiments of the invention in which an exclusive property or privilege is claimed are defined as follows:

1. A manually-operated splice assembly tool for applying an assembly force to elastomeric component parts of an electrical connection to produce a splice connection in the field between a pair of electrical cables, with the elastomeric component parts being in assembled engagement, one over the other, in an interference fit, at least one of the elastomeric component parts being generally tubular and having an internal surface and an external surface including a cylindrical end external surface portion, a further external surface portion and an external shoulder between the end external surface portion and the further extenal surface portion, said tool comprising:

force applying means enabling a rotary force applied manually thereto to be converted into a longitudinal force;

a first structural member for supporting the force applying means;

a second structural member;

a substantially flexible transmission means coupled between the first and second structural members, said transmission means transmitting said longitudinal force between said first and second structural members;

first coupling means for coupling the first structural member to said one of the elastomeric component parts, the first coupling means including circular-shaped means having an open end for receiving therein said cylindrical end external surface portion and abutting against the external shoulder of the external surface whereby the first structural member will be coupled solely to the cylindrical end external surface portion of said one of the elastomeric component parts to render the entire internal surface thereof and the further external surface portion of the external surface thereof available for said assembled engagement with another component part of the connection; and second coupling means for coupling the second structural member to the other of said elastomeric component parts such that the required assembly force is provided solely by the longitudinal force transmitted by the transmission means during assembly.

2. The splice assembly tool of claim 1 wherein:
the first structural member includes a housing; and
the circular-shaped means of the first coupling means includes a sleeve-like spacer member on the housing for receiving therein the cylindrical end external surface portion and abutting against the external shoulder of the external surface of said one elastomeric component part.

3. The splice assembly tool of claim 2 wherein the other elastomeric component part is the insulation jacket of one of the cables and the second structural member includes a retaining member fixed to said one of the cables, the transmission means being coupled to said retaining member.

4. A splice assembly tool as recited in claim 3 wherein said force applying means includes gearing means, said gearing means comprising a drive gear member and a follower gear member, said drive gear member being in meshed operative engagement with said follower gear member, said drive gear member driving said follower gear member when said rotary force is applied thereto.

5. A splice assembly tool as recited in claim 4 wherein said follower gear member includes a drum means, said transmission means being attached to said drum means at a first end thereof, and being attached to said second structural member at a second end thereof, said drum means being adaptable to reel in said transmission means from said first end when under an influence of said rotary force applied to said driving gear.

6. A splice assembly tool as recited in claim 4 wherein said force applying means further comprises a drive shaft and a follower shaft, said driving shaft being rotatably mounted within said first structural member, said drive gear member being positively retained on said drive shaft in a manner to rotate in a same direction as said drive shaft when said drive shaft is under an influence of said rotary force, said follower shaft being immovably mounted within said first structural member, said follower gear member and said drum means being rotatably mounted upon said follower shaft in a manner to be driven by said drive shaft when said drive shaft is under said influence of said rotary force.

7. A splice assembly tool as recited in claim 6 wherein said drive shaft member is adapted at distal ends thereof for being torqued by a hand wrench.

8. A splice assembly tool as recited in claim 7 wherein said first structural member further comprises a pawl member affixed thereon, said pawl member being mounted on said first structural member in a manner to enable said pawl member to be in removable meshed relationship with said follower gear member, said pawl member being biased with a biasing means in a manner to enable said pawl member while in meshed engagement with said follower gear member to allow said follower gear member to be driven by said drive gear member while preventing said follower geat member from slipping and reversing direction during said torquing of said driving shaft member.

9. The splice assembly tool of claim 5 wherein the transmission means includes a wire rope member extending through the sleeve-like spacer member and into the one elastomeric component part.

10. The splice assembly tool of claim 9 wherein the retaining member is a hook having diametral dimensions small enough to enable the hook to pass through the spacer member and said one elastomeric component part.

11. The splice assembly tool of claim 1 wherein:
the first structural member comprises a housing including two selectively assembled half-sections; and
the circular-shaped means of the first coupling means includes an opening centrally located with respect to said half-sections for receiving therein the cylindrical end external surface portion of the external surface of said one elastomeric component part, with the perimeter of the opening abutting the external shoulder of the external surface of said one elastomeric component part whereby the half-sections are selectively assembled about the end external surface portion to couple the first structural member to the one elastomeric component part.

12. The splice assembly tool of claim 11 including a circular-shaped collar at the perimeter of the opening located in the half-sections of the housing, the collar including two halves, with each one of said halves being integral with a corresponding half-section of the housing.

13. The splice assembly tool as recited in claim 11 wherein said transmission includes a roller chain member.

14. The splice assembly tool as recited in claim 11 wherein said first structural member further comprises a pawl member affixed thereto, said pawl member being mounted upon said first structural member in a manner to enable said pawl member to be in a removable mesh relationship with a first gearing means, said pawl member being biased by a biasing means such that said pawl member while being in meshed engagement with said first gearing means is enabled to prevent said first gearing means from slipping and reversing direction while said first gearing means is rotating.

15. A splice assembly tool of a type for assembling component parts of an electrical connection for producing a splice connection between a pair of electrical cables comprising:
(a) a first structural member adaptable for supporting a first force applying means thereon, said force applying means enabling a rotary force applied manually thereto to be converted into a longitudinal force for application against a first elastomeric component part of said electrical connection,
(b) a second structural member adaptable for engaging a second elastomeric component part of said electrical connection in a manner to assist said first structural member in assembling said first component part relative to said second component part of said electrical connection, said first and second elastomeric component parts being assembled relative to one another via an interference fit; and
(c) a substantially flexible transmission means coupled between said first and second electrical members, said transmission means conveying said longitudinal force between said first and said second structural members, and wherein said first component part is an adapter sleeve positioned on one of said cables, said second component part is a tubular elastomeric sleeve, and said tubular elastomeric sleeve is axially positioned about said adaptor sleeve with an interference fit, wherein said second structural member is adaptable for being movable with respect to said first structural member, said second structural member engaging said tubular elastomeric sleeve in a manner to be in abutting engagement therewith and in a manner to enable said second structural member to continuously move said sleeve member from a first position to a second position, when under an influence of said longitudinal force, said tubular elastomeric sleeve being assembled over said adaptor sleeve with said interference fit when moved into said second position, wherein said force applying means includes first gearing means mounted on said first structural member and said first gearing means includes at least one drive gear member and at least one follwer gear member, said at least one drive gear member being in meshed engagement with said at least one follower gear member said at least one follower gear member being driven by said at least one drive gear member when said rotary force is applied thereto, said at least one follower gear member including a first sprocket gear member coupled thereto, and wherein said second structural member supports second gearing means thereon, said transmission means being coupled between said first and said second structural members in a manner to operatively engage said first and said second gearing means such that said first structural member is adaptable for being in abutting engagement with said adaptor sleeve and said first structural member being immovably retained by said adaptor sleeve when under said influence of said longitudinal force.

16. A splice assembly tool of a type for assembling component parts of an electrical connection for producing a splice connection between a pair of electrical cables comprising:

(a) a first structural member adaptable for supporting a first force applying means thereon, said force applying means enabling a rotary force applied manually thereto to be converted into a longitudinal force for application against a first component part of said electrical connection;

(b) a second structural member adaptable for engaging a second component part of said electrical connection in a manner to assist said first structural member in assembling said first component part relative to said second component part of said electrical connection; and (c) transmission means for operatively coupling said first and second structural members for conveying said longitudinal force between said first and said second structural members, and wherein said first component part is an adaptor sleeve positioned on one of said cables, said second component part is a tubular elastomeric sleeve, and said tubular elastomeric sleeve is axially positioned about said adaptor sleeve with an interference fit, and wherein said second structural member is adapted for being movable with respect to said first structural member, said second structural member engaging said tubular elastomeric sleeve in a manner to be in abutting engagement therewith and in a manner to enable said second structural member to continuously move said sleeve member from a first position to a second position, when under an influence of said longitudinal force, said tubular elastomeric sleeve being assembled over said adaptor sleeve with said interference fit when moved into said second position, and wherein force applying means includes first gearing means mounted on said first structural member and said first gearing means includes at least one drive gear member and at least one follower gear member, said at least one drive gear member being in meshed engagement with said at least one follower gear member, said at least one follower gear member being driven by said at least one drive gear member when said rotary force is applied thereto, said at least one follower gear member including a first sprocket gear member coupled thereto, and wherein said second structural member supports second gearing means thereon, said transmission means being coupled between said first and said second structural members in a manner to operatively engage said first and said second gearing means such that said first structural member is adaptable for being in abutting engagement with said adaptor sleeve and said first structural member being immovably retained by said adaptor sleeve when under said influence of said longitudinal force wherein said second gearing means comprises at least one second sporcket gear member, and said transmission means comprises a chain member, said chain member having a first end operatively connected to said first sprocket gear member and having a second end operatively connected to said at least one second sprocket gear member, said chain member being adapted at said first end to be reeled in by said first sprocket gear member and being adapted at said second end to pull said second structural member at said at least one second sprocket gear member in a longitudinal direction towards said first structural gear member from said first position to said second position when under said influence of said longitudinal force.

17. The splice assembly tool as recited in claim 16 wherein said first sprocket gear member is enabled to said reel in said chain member when said torquing force is applied manually to said drive gear member, whereby said second structural member is said enabled to move said outer splice sleeve housing from said first position to said second position.

18. The splice assembly tool as recited in claim 17, further including a drive gear shaft rotatably mounted within said first structural member and at least one follower gear shaft immovably mounted within said first structural member, said at least one drive gear member being mounted upon said drive gear shaft to rotate in a same direction as said first drive gear shaft when under said influence of said torquing force, said at least one first follower gear and said first sprocket gear member being mounted upon said at least one first follower shaft so as to both be driven by said driving gear when under said influence of said torquing force.

19. A method of assembling elastomeric component parts of an electrical connection for producing a splice connection in the field between a pair of electrical cables, with the elastomeric component parts in assembled engagement, one over the other, in an interference fit, at least one of the elastomeric component parts being generally tubular and having an internal surface and an external surface including a cylindrical end external surface portion, a further external surface portion and an external shoulder between the end external surface portion and the further external surface portion, said method comprising the steps of:

coupling a first structural member to said one of the elastomeric component parts by receiving the cylindrical end external surface portion thereof within a complementary means on the first member, with the complementary means abutting the external shoulder of the external surface of said one of the elastomeric component parts whereby the first structural member is coupled solely to the cylindrical end external surface portion of said one of the elastomeric component parts to render the entire internal surface thereof and the further external surface portion of the external surface thereof available for said assembled engagement with another component part of the connection;

coupling a second structural member to the other of said elastomeric parts;

providing the first structural member with a force applying means enabling a rotary force applied manually thereto to be converted into a longitudinal force;

coupling a substantially flexible transmission means between the first and second structural members for transmitting said longitudinal force between said first and second structural members;

engaging said one of the elastomeric component parts with said other of the elastomeric component parts;

applying a rotary force to said force applying means to generate said longitudinal force and establish and assembly force provided solely by the longitudinal force transmitted by the transmission means during assembly; and continuing the application of said rotary force until said other of the elastomeric component parts is engaged fully with at least one of said entire available internal surface and further external surface portion of said one of the elastomeric component parts.

20. The method of claim 19 wherein said other of the elastomeric component parts is engaged initially with the internal surface of said one of the elastomeric component parts at the end opposite the cylindrical end external surface portion thereof, and the transmission means is passed through said one of the elastomeric component parts such that the assembly force moves said other of the elastomeric component parts longitudinally toward the cylindrical end external surface portion and into said one of the elastomeric component parts.

21. The method of claim 19 wherein said other of the elastomeric component parts is engaged with the further external surface portion of the external surface of said one of the elastomeric component parts at the end opposite the cylindrical end external surface portion thereof, and the transmission means is passed over said one of the elastomeric component parts such that the assembly force moves said other of the elastomeric component parts longitudinally toward the cylindrical end external surface portion and over said one of the elastomeric components parts.

* * * * *